United States Patent
Kagata et al.

(10) Patent No.: US 9,534,125 B2
(45) Date of Patent: Jan. 3, 2017

(54) WHITE INK COMPOSITION FOR INK JET RECORDING

(71) Applicant: Seiko Epson Corporation, Tokyo (JP)

(72) Inventors: Takayoshi Kagata, Shiojiri (JP); Tsuyoshi Sano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 52 days.

(21) Appl. No.: 14/226,184

(22) Filed: Mar. 26, 2014

(65) Prior Publication Data

US 2014/0292899 A1  Oct. 2, 2014

(30) Foreign Application Priority Data

Mar. 26, 2013  (JP) .................................. 2013-063536

(51) Int. Cl.
   C09D 11/30   (2014.01)
   C09D 11/102  (2014.01)
   C09D 11/104  (2014.01)
   C09D 11/106  (2014.01)

(52) U.S. Cl.
   CPC ............. *C09D 11/30* (2013.01); *C09D 11/102* (2013.01); *C09D 11/104* (2013.01); *C09D 11/106* (2013.01)

(58) Field of Classification Search
   None
   See application file for complete search history.

(56) References Cited

U.S. PATENT DOCUMENTS

| 7,513,945 | B2 | 4/2009 | Nakano et al. | |
| 2011/0262724 | A1* | 10/2011 | Okuda et al. | 428/207 |
| 2012/0079960 | A1* | 4/2012 | Okuda et al. | 106/31.65 |
| 2012/0147085 | A1* | 6/2012 | Hirata et al. | 347/20 |
| 2013/0108841 | A1* | 5/2013 | Denda et al. | 428/195.1 |
| 2013/0257034 | A1* | 10/2013 | Shimohara et al. | 283/62 |

FOREIGN PATENT DOCUMENTS

| JP | 06-009714 A | 1/1994 |
| JP | 2001-220526 A | 8/2001 |
| JP | 2001-310937 A | 11/2001 |
| JP | 2007-016103 A | 1/2007 |
| JP | 2011-153208 A | 8/2011 |
| JP | 2012-025884 A | 2/2012 |
| JP | 2012-025886 A | 2/2012 |
| JP | 2012-251142 A | 12/2012 |

OTHER PUBLICATIONS

Chemical Book, 2010, CAS No. 121-44-8.*
Chemical Book, 2010, CAS No. 4767-03-7.*
Chemical Book, 2010, CAS No. 117344-32-8.*
Chemical Book, 2010, CAS No. 4098-71-9.*
Chemical Book, 2010, CAS No. 75-01-4.*
Vinyblan 271 MSDS, Mar. 1, 2012.*

* cited by examiner

*Primary Examiner* — An Do
*Assistant Examiner* — Renee I Wilson
(74) *Attorney, Agent, or Firm* — Nutter McClennen & Fish LLP; John J. Penny, Jr.; Alex Nagomiy

(57) ABSTRACT

A white ink composition for ink jet recording, substantially not containing a metal oxide or hollow resin particles, contains resin particles having a refractive index of 1.6 or more, and a material (B) including at least one material selected from the group consisting of a first material having a refractive index in the range of 1.5 to less than 1.6, a second material having a refractive index in the range of 1.4 to less than 1.5, and a third material having a refractive index of less than 1.4.

17 Claims, No Drawings

WHITE INK COMPOSITION FOR INK JET RECORDING

Priority is claimed under 35 U.S.C. §119 to Japanese Application No. 2013-063536 filed on Mar. 26, 2013, is hereby incorporated by reference in its entirety.

BACKGROUND

1. Technical Field

The present invention relates to a white ink composition used for ink jet recording.

2. Related Art

An ink jet recording apparatus is known which includes nozzles through which ink is ejected in the form of droplets. For creating desired images using an ink jet recording apparatus, a variety of ink jet recording inks have been used which contain different constituents depending on the applications.

A white ink composition used for recording an white image on a recording medium is one of the ink jet recording inks. In general, a white ink composition contains a white coloring material, such as silica, titanium oxide or any other metal oxide, or hollow resin particles. The white coloring material enables the recorded image to look white. For example, JP-A-2012-25886 and JP-A-2012-25884 each disclose an ink set including an ink composition containing a pigment and a polymer and a white ink composition containing hollow resin particles and a urethane resin. In these ink sets, the refractive indices of the polymer, the hollow resin particles, and the urethane resin are controlled so that the difference between the highest and the lowest refractive index of the three refractive indices is 0.1 or less. Consequently, the ink sets can form images having good fixity with little unevenness in gloss.

On the other hand, a different type of white ink composition is known which contains resin particles having a high refractive index, instead of the above-mentioned white coloring materials such as metal oxides or hollow resin particles. For example, JP-A-2012-251142 discloses a white ink composition in which resin particles whose molecule has a fluorene skeleton are dispersed in water. The use of this white ink composition allows the surface of the recording medium to be covered with a white image without being viewed through the image.

However, when titanium oxide is used as a white coloring material, the titanium oxide is liable to settle during storage due to the difference in specific gravity from the medium of the white ink composition, such as water or an organic solvent. On the other hand, when hollow resin particles as disclosed in the above cited JP-A-2012-25886 and JP-A-2012-25884 are used, the settling of the coloring material during storage is more alleviated, but insufficiently, than when titanium oxide is used.

If the white coloring material settles, the sediment of the coloring material hinders the ink from flowing and causes ejection failure. Also, the concentration of the coloring material in the ink is reduced and, consequently, the whiteness of the recorded image can be reduced undesirably.

If a pressure is applied to the hollow resin particles, the hollows of the particles can be crushed. The hollow resin particles are each defined by a shell, and the difference in refractive index between the shell and the internal hollow enables the recorded image to look white. If the hollows are crashed, the whiteness of the image is reduced.

One of the solutions of those problems is to use resin particles having a high refractive index as disclosed in JP-A-2012-251142 instead of titanium oxide or hollow resin particles. Such resin particles are expected to minimize the above problems.

Unfortunately, resin particles having a high refractive index as disclosed in JP-A-2012-251142 cannot be satisfactorily adhere to the recording medium in some cases, and accordingly, the rub fastness of the recorded image may be insufficient. For this measure, a material capable of increasing the fixity of the resin particles can be added to the ink to enhance the rub fastness. However, the whiteness of the image may be reduced depending on the material added.

SUMMARY

An advantage of some aspects of the invention is that it provides a white ink composition for ink jet recording that can be stably stored and can form highly white images having good rub fastness.

The following embodiments can solve at least part of the issue described above.

Application 1

According to an aspect of the invention, a white ink composition substantially not containing a metal oxide or hollow resin particles is provided for ink jet recording. The white ink composition contains resin particles (A) having a refractive index of 1.6 or more, and a material (B) including at least one material selected from the group consisting of a first material having a refractive index in the range of 1.5 to less than 1.6, a second material having a refractive index in the range of 1.4 to less than 1.5, and a third material having a refractive index of less than 1.4. When the first material is contained, the proportion of the first resin material is in the range of 5 to 34 parts by mass relative to 100 parts by mass of the resin particles (A). When the second material is contained, the proportion of the second material is in the range of 5 to 50 parts by mass relative to 100 parts by mass of the resin particles (A). When the third material is contained, the proportion of the third material is in the range of 5 to 100 parts by mass relative to 100 parts by mass of the resin particles (A).

Such a white ink composition can be stably stored and form highly white images having good rub fastness.

Application 2

The resin particles (A) may be made of at least one resin selected from the group consisting of melamine-based resins, phenol-based resins, vinylidene chloride-based resins and fluorene-based resins.

Application 3

The material (B) may be at least one material selected from the group consisting of fluororesins, acrylic resins, styrene resins, and polymerizable monomers.

Application 4

The white ink composition may contain 30% by mass or less of a polymerizable monomer as the material (B).

Application 5

The white ink composition may be capable of forming an image having an average total light transmittance (Tt) and an average diffuse transmittance (Td) on a recording medium. The ratio (Td/Tt) of the average diffuse transmittance (Td) to the average total light transmittance (Tt) is 0.1 or more. In this instance, the average total light transmittance Tt is an average of total light transmittances measured every 1 nm in wavelength from 380 nm to 800 nm, and the average diffuse transmittance Td is an average of diffuse transmittances measured every 1 nm from 380 nm to 800 nm.

Application 6

The resin particles (A) may have an average particle size of 200 nm or more on a volume basis.

Application 7

The content of the resin particles (A) may be in the range of 5% to 30% by mass.

Application 8

According to another aspect of the invention, an ink jet recording method using the white ink composition is provided.

DESCRIPTION OF EXEMPLARY EMBODIMENTS

Preferred embodiments of the invention will now be described. The following embodiments will be described by way of example. The invention is not limited to the disclosed embodiments, and various modifications may be made within the scope and spirit of the invention.

White ink compositions mentioned herein refer to inks that can form images having a color generally called "white" and may be slightly colored with another color. The white ink compositions include inks commercially available as "white ink". Also, the white ink compositions include an ink that can form an image having a lightness ($L^*$) and chromaticities ($a^*$, $b^*$) satisfying the relationships $70 \leq L^* \leq 100$, $-4.5 \leq a \leq 2$, and $-6 \leq b \leq 2.5$ when the ink is used for recording on genuine Epson glossy photo paper (manufactured by Seiko Epson) at a duty of 100% or in an amount in which the surface of the photo paper is completely covered with the ink. In this instance, the lightness ($L^*$) and the chromaticities ($a^*$, $b^*$) are measured with a spectrophotometer Spectrolino (manufactured by GretagMacbeth) with a D50 light source at an observation viewing angle of 2° according to a DIN NB density standard in a measurement mode of Reflectance (white standard: Abs; No filter).

The duty mentioned herein is a value defined by the following equation:

$$\text{Duty (\%)} = \text{number of dots actually ejected}/(\text{vertical resolution} \times \text{horizontal resolution}) \times 100,$$

wherein the "number of dots actually ejected" is that per unit area, and the "vertical resolution" and "horizontal resolution" are those per unit length.

The phrase "substantially not containing A" or "not substantially contain A" mentioned herein means that A is not added on purpose or is added in such a small amount that it is ineffective. For example, an ink composition substantially not containing A does not contain A in an amount of 1.0% by mass or more, preferably 0.5% by mass or more, more preferably 0.1% by mass or more, still more preferably 0.05% by mass or more, particularly preferably 0.01% by mass or more, and desirably 0.001% by mass or more.

The word "image" mentioned herein refers to a pattern defined by dots, including recorded character information and a solid pattern.

1. White Ink Composition

The white ink composition for ink jet recording (hereinafter simply referred to as white ink) of an embodiment of the invention does not substantially contain a metal oxide or hollow resin particles, but contains resin particles (A) having a refractive index of 1.6 or more, and a material (B) including at least one material selected from the group consisting of a first material having a refractive index in the range of 1.5 to less than 1.6, a second material having a refractive index in the range of 1.4 to less than 1.5, and a third material having a refractive index of less than 1.4. When the first material is contained, the proportion of the first resin material is in the range of 5 to 34 parts by mass relative to 100 parts by mass of the resin particles (A). When the second material is contained, the proportion of the second material is in the range of 5 to 50 parts by mass relative to 100 parts by mass of the resin particles (A). When the third material is contained, the proportion of the third material is in the range of 5 to 100 parts by mass relative to 100 parts by mass of the resin particles (A).

The white ink may be used for recording an image on a recording medium, such as a plastic or metal sheet, which is not always white. In this instance, the white ink may be used for forming a base layer to hide the color of the recording medium or reduce the transmittance of a color image. The use of the white ink is not limited to this, and the white ink of an embodiment may be used for simply forming a white image.

The constituents and physical properties of the white ink of an embodiment and a method for preparing the white ink will now be described.

1. 1. Resin Particles (A)

The white ink contains resin particles (A) having a refractive index of 1.6 or more. Since the refractive index is as high as 1.6 or more, the resin particles (A) scatter light effectively, so that the whiteness of the recorded image can be significantly increased. Since the white ink of the present embodiment contains such resin particles (A), white images can be formed even though the white ink does no substantially contain titanium oxide or hollow resin particles generally used as a white coloring material.

The resin particles (A), which is made of a resin, have a lower specific gravity than titanium oxide, and accordingly does not easily settle in the white ink. Thus, the white ink can be stably stored (has good storage stability).

The refractive index of resin particles (A) mentioned herein refers to that of a 1 µm thick coating formed using the resin particles (A). More specifically, the coating of the resin particles (A) is formed as below. First, 1 part by mass of the resin particles (A) are added to 100 parts by mass of a medium such as ethanol or toluene, and the mixture is stirred to yield a resin-dispersed liquid. The resulting resin-dispersed liquid is applied to a flat glass plate, and then the glass plate is allowed to stand at 25° C. in a vacuum dryer for 24 hours to remove the medium. Thus, a 1 µm thick coating of the resin particles (A) is formed.

The refractive index of the coating is measured at 25° C. under the standard conditions with a refractometer, such as an Abbe refractometer DR-A1 (manufactured by ATAGO). If the coating has a high refractive index (for example, when the refractive index measured with the Abbe refractometer DR-A1 is 1.7 or more), the refractive index can be measured with a spectroscopic ellipsometer, instead of the Abbe refractometer DR-A1, at a temperature of 25° C. and a wavelength of 589.3 nm.

The refractive index of the resin particles (A), which is 1.6 or more, is preferably in the range of 1.6 to 1.9, more preferably in the range of 1.7 to 1.9. When the resin particles (A) have a refractive index of 1.6 or more, the whiteness of the recorded image is significantly increased. In contrast, when the refractive index is less than 1.6, the recorded image cannot exhibit sufficient whiteness. However, resin particles (A) having a refractive index of more than 1.9 are technically difficult to produce.

Preferably, the resin particles (A) have an average particle size of 200 nm or more, more preferably in the range of 200 nm to 1000 nm, still more preferably in the range of 300 nm to 500 nm, on a volume basis. The average particle size on a volume basis herein after simply referred to as average particle size. The use of resin particles (A) having an average particle size of 200 nm or more further increases the whiteness of the recorded image. In addition, the resin particles (A) having an average particle size of 1000 nm or less can be satisfactorily dispersed in the white ink, accordingly enhancing the storage stability of the white ink.

The average particle size of the resin particles (A) can be measured with a particle size distribution analyzer based on a laser diffraction/scattering method. A particle size distribution meter using dynamic light scattering (for example, Microtrac UPA manufactured by Nikkiso Co., Ltd.) may be used as the particle size distribution analyzer.

The content of resin particles (A) is preferably in the range of 5% to 30% by mass, more preferably 7% to 25% by mass, and particularly preferably 10% to 20% by mass, relative to the total mass of the white ink. When the resin particles (A) content is in the above ranges, particularly not less than 5% by mass, the recorded image can exhibit still higher whiteness. Also, when the resin particles (A) content is in the above ranges, particularly not more than 30% by mass, the ink is likely to be stably ejected.

Although the resin particles (A) can be made of any material having a refractive index of 1.6 or more, the material of resin particles (A) is preferably at least one selected from the group consisting of melamine-based resins, phenol-based resins, vinylidene chloride-based resins and fluorene-based resins from the viewpoint of obtaining resin particles having a high refractive index. Among these resins, fluorene-based resins are particularly preferred from the viewpoint of the abrasion resistance of the resin particles.

Melamine-based resin is the general name of resins (polymers) produced by polymerization (polycondensation) of melamine and formaldehyde, and includes melamine, melamine-urea copolymer, and melamine-phenol copolymer. The melamine-based resin may be a commercially available product of methylol melamine, such as Nicaresin (product name) produced by Nippon Carbide Industries. Melamine-based resins may be used singly or in combination.

Phenol-based resin is the general name of resins (polymers) produced by polymerization (polycondensation) of phenol and formaldehyde. The phenol-based resin may be a commercially available produce, such as Bisphenol S (produced by Konishi Chemical Ind.) and TD-4304, PE-201L and PE-602 (each produced by DIC). Phenol-based resins may be used singly or in combination.

Vinylidene chloride-based resin is the general name of resins (polymers) whose molecule includes a skeleton having a vinylidene group containing a chlorine atom, and includes vinylidene chloride resins, vinylidene chloride-acrylonitrile copolymer, and vinylidene chloride-vinyl chloride copolymer. The vinylidene chloride-based resin may be a commercially available product such as Diofan (produced by Solvay Specialty Polymers). Vinylidene chloride-based resins may be used singly or in combination.

Fluorene-based resin is the general name of resins (polymers) whose molecule includes a fluorene skeleton, and can be produced by polymerization (in, for example, a known melt polymerization process) of a monomer including a fluorene skeleton, such as a diol, diamine, dicarboxylic acid or diisocyanate having a fluorene skeleton, and any other monomer.

Examples of fluorene-based resin include polyesters having a fluorene skeleton, polycarbonates having a fluorene skeleton, polyamides having a fluorene skeleton, polyurethanes having a fluorene skeleton, and epoxy resins having a fluorene skeleton. Fluorene-based resins may be used singly or in combination. Polyesters having a fluorene skeleton are preferably used as the fluorene-based resin from the viewpoint of obtaining resin particles having a high refractive index.

Commercially available fluorene-based resins may be used, such as OKP4, OKP4HT, PG-100, CG-500, EG-200, NV-203-R4, and CP-001 (each produced by Osaka Gas Chemicals).

Preferably, the resin of the resin particles (A) has a molecular structure having at least one selected from the group consisting of aromatic rings, halogens (particularly bromine), sulfur, and metal atoms (particularly titanium and zirconium), from the viewpoint of increasing the refractive index.

The resin particles (A) can be obtained by a known process suitable for the nature of the material used. For example, monomers as the raw materials of the resin particles may be subjected to, for example, suspension polymerization or emulsion polymerization to obtain resin particles, or a resin that has been prepared by polymerization may be dispersed in a solvent to obtain resin particles.

The resin particles (A) may contain an additive. Examples of the additive include a plasticizer, a softener, a dispersant, a stabilizing agent, an antistatic agent, a flame retardant, an antiblocking agent, a crystal nucleating agent, a filler, and a conducting agent.

1. 2. Material (B)

The white ink of the present embodiment contains a material (B) having a refractive index of less than 1.6. The material (B) is used to increase the rub fastness of the recorded image.

Any material can be used as the material (B) as long as it has a refractive index of less than 1.6 and can increase the rub fastness of the recorded image, and a material (for example, resin or polymerizable monomer) that can enhance the fixity of the resin deposited on the recording medium is preferred.

The material (B) may be, for example, a fluororesin, an acrylic resin, or a styrene-based resin, and may be in the form of liquid or particles (resin particles). These resins may be used singly or in combination.

Examples of the fluororesin include polytetrafluoroethylene, perfluoroalkoxyalkane, perfluoroethylenepropene copolymer, ethylene-tetrafluoroethylene copolymer, polyvinylidene fluoride, polychlorotrifluoroethylene, ethylene-chlorotrifluoroethylene copolymer, tetrafluoroethylene-perfluorodioxol copolymer, and polyvinyl fluoride. A commercially available fluororesin may be used, such as polytetrafluoroethylene named Polyflon D-210C, produced by Daikin Industries.

Examples of the acrylic resin include poly(meth)acrylic acid, (meth)acrylic acid-acrylonitrile copolymer, (meth)acrylic acid-methacrylonitrile copolymer, vinyl acetate-(meth)acrylic ester copolymer, (meth)acrylic acid-(meth)acrylic ester copolymer, styrene-(meth)acrylic acid copolymer, styrene-methacrylic acid-acrylic ester copolymer, styrene-α-methylstyrene-(meth)acrylic acid copolymer, and styrene-α-methylstyrene-(meth)acrylic acid-(meth)acrylic ester copolymer. (Meth)acrylic acid refers to both acrylic acid and methacrylic acid. A commercially available acrylic resin may be used, such as UC-3000 or UC-3510 (produced by Toagosei).

Examples of the styrene-based resin include polystyrene, styrene-maleic acid copolymer, and styrene-maleic anhydride copolymer. A commercially available styrene-based resin may be used, such as a styrene-maleic acid copolymer named Arastar-700, produced by Arakawa Chemical Industries.

The term polymerizable monomer mentioned herein refers to a monomer that can be polymerized by applying light, heat or any other energy. More specifically, the polymerizable monomer initiates polymerization by applying light or heat in the presence of a radical precursor.

Examples of the polymerizable monomer include (meta) acrylates, such as monofunctional (meth)acrylates (for example, phenoxyethyl (meth)acrylates), bifunctional (meth)acrylates (for example, diethylene glycol di(meth) acrylates), and trifunctional or more functional (meth)acrylates (for example, trimethylolpropane tri(meth)acrylates and pentaerythritolethoxy tetra(meth)acrylates).

Examples of the radical precursor include photopolymerization initiators such as acetophenone and acylphosphine oxides, and thermal polymerization initiators such as tert-butyl peracetate.

The refractive index of the material (B) can be obtained by measuring that of a coating of the material (B) in the same manner as in the case of resin particles (A). If a polymerizable monomer is used as the material (B), the coating of the material (B) used for measuring the refractive index can be formed as below. Relative to 100 parts by mass of a polymerizable monomer, 11 parts by mass of a radical precursor is added, and the mixture is stirred to yield a polymerizable composition. The polymerizable composition is applied to a flat glass plate and irradiated with an amount of UV light or heat sufficient to cure the composition, thus forming a coating of 1 μm in thickness.

The material (B) can increase the rub fastness of the recorded image. However, the material (B) coats the surfaces of the resin particles (A), thereby undesirably reducing the whiteness of the recorded image. The decrease in the whiteness of an image is likely to occur when the refractive index of the material (B) is close to that of the resin particles (A), and tends to be remarkable particularly when the refractive index of the material (B) is in the range of 1.4 to less than 1.6. Accordingly, the proportion of the material (B) to the resin particles (A) in the white ink is varied according to the refractive index of the material (B).

When a first material having a refractive index in the range of 1.5 to less than 1.6 is used as the material (B), therefore, the proportion of the first material is in the range of 5 to 34 parts by mass relative to 100 parts by mass of the resin particles (A), and is preferably in the range of 10 to 24 parts by mass. The use of the first material in a proportion of 34 parts by mass or less can minimize the decrease in the whiteness of the recorded image. Also, the use of the first material in a proportion of 5 parts by mass or more can further increase the rub fastness of the recorded image.

Similarly, when a second material having a refractive index in the range of 1.4 to less than 1.5 is used as the material (B), the proportion of the second material is in the range of 5 to 50 parts by mass relative to 100 parts by mass of the resin particles (A), and is preferably in the range of 10 to 35 parts by mass. The use of the second material in a proportion of 50 parts by mass or less can minimize the decrease in the whiteness of the recorded image. Also, the use of the second material in a proportion of 5 parts by mass or more can further increase the rub fastness of the recorded image.

The third material, whose refractive index is less than 1.4, has a sufficient difference (more than 0.2) in refractive index from the resin particles (A). Therefore, when a third material is used as the material (B), the proportion of the third material to the resin particles (A) is hardly taken into account, and accordingly the preparation of the white ink can be advantageously easy. However, from the viewpoint of increasing the rub fastness of the recorded image and further increasing the whiteness of the recorded image, the proportion of the third material is in the range of 5 to 100 parts by mass relative to 100 parts by mass of resin particles, and is preferably in the range of 10 to 50 parts by mass.

The white ink composition of the present embodiment contains the resin particles (A) and the material (B) in the above proportion and, preferably, the polymerizable monomer content of the white ink is 30% by mass or less, more preferably 10% by mass or less, still more preferably 5% by mass or less, and desirably 0% by mass (not contained). Such a white ink can provide a recorded image having satisfactory whiteness. Since polymerizable monomers capable of being cured with, for example, UV light will form a polymer coating having a high refractive index by being cured, the whiteness of an image recorded with the white ink can be reduced.

Polymerizable compounds include radically polymerizable compounds and cationically polymerizable compounds. Examples of radically polymerizable compounds include allyl compounds, such as allyl ether compounds, ethylene glycol monoallyl ether, trimethylolpropane diallyl ether, trimethylolpropane monoallyl ether, glycerin monoallyl ether, allyl glycidyl ether, pentaerythritol triallyl ether, (meth)acrylic acid, (meth)acrylic compounds, and vinyl compounds. Examples of cationically polymerizable compounds include epoxy compounds, vinyl ether compounds and oxetane compounds that are disclosed in, for example, JP-A-6-9714, JP-A-2001-310937, or JP-A-2001-220526.

1. 3. Other Constituents

In an embodiment, the white ink may contain water, an organic solvent, a surfactant and other additives. These additives may increase the properties of the white ink.

1. 3. 1. Water

In an embodiment, the white ink may be an aqueous ink containing 50% or more of water. Since aqueous ink is less reactive to piezoelectric elements of recording heads or organic binders contained in recording media than non-aqueous (organic solvent-based) ink (for example, the ink disclosed in JP-A-2007-16103, which is an ink used for recorded articles), the piezoelectric elements and organic binders are not corroded or dissolved much by the aqueous ink. In addition, aqueous ink may be able to form images that can dry more easily than the images formed with a non-aqueous ink containing a large amount of a solvent having a high boiling point and a low viscosity. Furthermore, aqueous ink in which water accounts for 50% or more of the composition is advantageous in environmental protection.

1. 3. 2. Organic Solvent

The white ink may contain an organic solvent. The white ink may contain a plurality of organic solvents. Organic solvents that can be used in the white ink include, but are not limited to, 1,2-alkanediols, polyhydric alcohols, and pyrrolidone derivatives.

Exemplary 1,2-alkanediols include 1,2-propanediol, 1,2-butanediol, 1,2-pentanediol, 1,2-hexanediol, and 1,2-octanediol. Since 1,2-alkanediols are superior in increasing the wettability of the white ink to the recording medium and thus allows the white ink to wet the recording medium evenly, images formed on a recording medium may have good adhesion. If the white ink contains a 1,2-alkanediol, its content is preferably in the range of 1% to 20% by mass relative to the total mass of the white ink.

Exemplary polyhydric alcohols include ethylene glycol, diethylene glycol, propylene glycol, dipropylene glycol, 1,3-propanediol, 1,4-butanediol, 1,6-hexanediol, trimethylolpropane, and glycerin. Polyhydric alcohols can prevent the ink from drying to solidify at the nozzle ends of the head of the ink jet recording apparatus and thus can advantageously minimize clogging and ejection failure. If the white ink composition contains a polyhydric alcohol, its content is preferably in the range of 2% to 20% by mass relative to the total mass of the white ink.

Exemplary pyrrolidone derivatives include N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone. Pyrrolidone derivatives serve as a suitable dissolving agent of resin components. If the white ink contains a pyrrolidone derivative, its content is preferably in the range of 0.5 to 10% by mass relative to the total mass of the white ink.

1. 3. 3. Surfactant

In an embodiment, the white ink may contain a surfactant. The surfactant can reduce the surface tension to increase the wettability of the ink to the recording medium. Among surfactants, preferred are acetylene glycol-based surfactants, silicone surfactants, and fluorochemical surfactants.

Exemplary acetylene glycol-based surfactants include, but are not limited to, SURFYNOL series 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA and DF110D (each produced by Air Products and Chemicals Inc.), OLFINE series B, Y, P, A, STG, SPC, E1004, E1010, PD-001, PD-002W, PD-003, PD-004, EXP. 4001, EXP. 4036, EXP. 4051, AF-103, AF-104, AK-02, SK-14 and AE-3 (each produced by Nissin Chemical Industry), and ACETYLENOL series E00, E00P, E40 and E100 (each produced by Kawaken Fine Chemicals).

Exemplary silicone surfactants include, but are not limited to, polysiloxane-based compounds. For example, a polyether-modified organosiloxane may be used as a polysiloxane-based compound. Polyether-modified organosiloxanes are available from the market, such as BYK-306, BYK-307, BYK-333, BYK-341, BYK-345, BYK-346, and BYK-348 (each produced by BYK); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (each produced by Shin-Etsu Chemical).

An example of preferred fluorochemical surfactants may be a fluorine-modified polymer, such as BYK-340 (produced by BYK).

If the white ink contains a surfactant, its content is preferably in the range of 0.1% to 1.5% by mass relative to the total mass of the white ink.

1. 3. 4. Other Additives

In an embodiment, the white ink may further contain a pH adjuster, a preservative or a fungicide, a rust preventive, a chelating agent and other additives.

Examples of the pH adjuster include potassium dihydrogenphosphate, sodium dihydrogenphosphate, sodium hydroxide, lithium hydroxide, potassium hydroxide, ammonia, diethanolamine, triethanolamine, triisopropanolamine, potassium carbonate, sodium carbonate, and sodium hydrogencarbonate.

Examples of the preservative or fungicide include sodium benzoate, sodium pentachlorophenol, sodium 2-pyridinethiol-1-oxide, sodium sorbate, sodium dehydroacetate, and 1,2-dibenzothiazoline-3-one. Commercially available preservatives or fungicides include Proxel XL2 and Proxel GXL (each a product of Avecia), and Denicide CSA and NS-500W (each a product of Nagase Chemtex).

The rust preventive may be benzotriazole or the like.

Examples of the chelating agent include ethylenediaminetetraacetic acid and its salts, such as disodium dihydrogen ethylenediaminetetraacetate.

1. 4. Physical Properties

The white ink can form an image defined by an aggregate of droplets on a recording medium by being ejected from an ejection head of an ink jet recording apparatus. The image formed with the white ink of an embodiment of the invention has the following properties.

The ratio of the average diffuse transmittance (Td) to the average total light transmittance (Tt) of the image is 0.1 or more. When this ratio (Td/Tt) is 0.1 or more, the image exhibits good whiteness.

The image used for measuring these properties is a solid pattern of the white ink formed on a transparent recording medium (for example, Epson Clear-proof Film, manufactured by Seiko Epson) using an ink jet recording apparatus (for example, PX-G930 manufactured by Seiko Epson) under the conditions: resolution of 1440 dpi×1440 dpi, dot weight of 11 ng, and duty of 100%.

The total light transmittance and diffuse transmittance of the white ink can be measured with a spectrophotometric colorimeter. For example, a multi-angle colorimeter ARM-500V (manufactured by JASCO Corporation) may be used as the spectrophotometric colorimeter.

The average total light transmittance (Tt) is the value calculated by arithmetically averaging the total light transmittances measured every 1 nm in wavelength from 380 nm to 800 nm, and the average diffuse transmittance (Td) is the value calculated by arithmetically averaging the diffuse transmittances measured every 1 nm in wavelength from 380 nm to 800 nm.

Preferably, the white ink has a surface tension at 20° C. in the range of 20 mN/m to 50 mN/m, more preferably in the range of 25 mN/m to 40 mN/m, from the viewpoint of the balance between the recording quality and the reliability of the white ink as an ink jet recording ink. The surface tension can be obtained by measuring an ink wetting a platinum plate at 20° C. with an automatic surface tensiometer CBVP-Z (manufactured by Kyowa Interface Science).

Also, the white ink preferably has a viscosity in the range of 2 mPa·s to 15 mPa·s, more preferably 2 mPa·s to 10 mPa·s, at 20° C. from the balance between the recording quality and the reliability of the white ink as an ink jet recording ink. The viscosity can be measured with a viscoelasticity meter MCR-300 (manufactured by Pysica) by increasing the shear rate to 10 to 1000 at 20° C. and reading the indication of the meter at a shear rate of 200.

1. 5. Preparation of Ink

The white ink of the present embodiment can be prepared in the same manner as known pigment inks, using a known apparatus, such as a ball mill, a sand mill, an attritor, a basket mill, or a roll mill. For the preparation, it is preferable that coarse particles be removed through a membrane filter, a mesh filter or the like.

1. 6. Miscellaneousness

Although the white ink containing resin particles (A) and material (B) has been described, the same effect as the effect of the white ink may be produced by the use of an ink set including different inks: a first ink containing resin particles (A); and a second ink containing a material (B).

In this instance, images having as good whiteness and rub fastness as those of the white ink of the present embodiment can be formed by mixing the first ink and the second ink on a recording medium with adjusting the resin particles (A) content of the first ink, the material (B) content of the second ink, and the amounts of inks ejected.

2. Ink Jet Recording Method

The ink jet recording method of an embodiment of the invention includes the step of forming an image on a recording medium by ejecting the white ink through the nozzle of a head of an ink jet recording apparatus to deposit the ink on the recording medium. Thus a recorded article including a white image recorded on the recording medium is produced.

Since the ink jet recording method uses the above-described white ink, the recorded image is likely to exhibit good whiteness and rub fastness. In addition, since the white ink has good storage stability, it can be stably ejected.

For the ink jet recording method, any of the known ink jet printers can be used, including printers using thermal jet technique, piezoelectric technique, continuous ink jet technique, roller application, or spray application.

Recording media that can be used in the ink jet recording method of the present embodiment include paper, cardboard, textile, leather, sheet or film, plastics, glass, ceramics, and metals.

3. Examples

The white ink of the present disclosure will be further described in detail with reference to Examples and Comparative Examples, but it is not limited to the Examples.

3. 1. Preparation of White Inks

The constituents shown in Table 1 were mixed and stirred. Then, the mixture was filtered through a metal filter of 5 μm in pore size and degassed with a vacuum pump. Thus white inks of Examples and Comparative Examples were prepared. The values in Table 1 are shown on a percent-by-mass basis, and ion exchanged water was added so that the total of the white ink would come to 100% by mass. The contents of resin and resin particles are shown on a solid basis.

The constituents designated by trade mane or an abbreviation in Table 1 are as follows:
  Fluorene-based resin particles (particles of polyester resin having a fluorene skeleton, see the preparation process below, refractive index: 1.71, average particle size: 300 nm)
  Hollow resin particles (prepared according to the process for producing white hollow resin particles described in Examples in JP-A-2012-25886, refractive index: 1.5, average particle size: 600 nm)
  Fluororesin (resin particles, refractive index: 1.35)
  Acrylic resin (resin particles, refractive index: 1.47)
  Styrene-based resin (resin particles, refractive index: 1.53)
  BYK-348 (trade name, silicone surfactant produced by BYK)

Preparation of Fluorene-Based Resin Particles

The fluorene-based resin particles were prepared as below. First, 150 parts by mass of acetonitrile was added to a solution prepared by adding 5 parts by mass of a polyester resin having a 9,9-bis-phenylfluorene skeleton (OKP4, produce by Osaka Gas Chemicals) to 45 parts by mass of tetrahydrofuran (THF). The mixture was stirred at room temperature (20° C.) at a motor rotational speed of 200 rpm to yield a dispersion liquid containing resin particles. Subsequently, the dispersion liquid containing resin particles was heated in a three-neck flask in a mantle heater to evaporate the medium (THF and acetonitrile). While this operation was performed, water was added and the resin particles were dispersed in the water so that the concentration of the dispersion of the resin particles could be even, without separating the resin particles from the dispersion medium. Then, when the temperatures of the dispersion liquid and the vapor became stable at around 100° C., the heating was stopped and the replacement of the medium with water was finished. The sample was cooled to room temperature to yield a dispersion of resin particles in water.

Measurement of Refractive Index

The above refractive indices of the resin particles and resins represent those of coatings formed as below. First, 1 part by mass of resin particles (or resin) was added to 100 parts by mass of a medium (ethanol or toluene), and the mixture was stirred to yield a resin dispersion liquid. Subsequently, the resin dispersion liquid was applied to a flat glass plate, and the glass plate was allowed to stand at 25° C. in a vacuum dryer for 24 hours to remove the medium. Thus a coating of the resin particles of 1 μm in thickness was formed. The thus formed coating was separated from the flat glass plate and subjected to measurement for refractive index with an Abbe refractometer DR-A1 (manufactured by ATAGO) at 25° C. under the standard conditions.

For the coating of fluorene-based resin particles, its refractive index was measured with a spectroscopic ellipsometer VASE (produced by J. A. Woollam) at 25° C. and a wavelength of 589.3 nm, instead of using the Abbe refractometer DR-A1, because it exceeded 1.7 or the measurement limit of the Abbe refractometer.

Measurement of Particle Size

The particle size of the resin particles was measured on a volume basis using a particle size distribution meter Microtrac UPA (manufactured by Nikkiso Co., Ltd.).

3. 2. Evaluations 3. 2. 1. Whiteness

The ink chamber of the cartridge of an ink jet printer (PX-G930 manufactured by Seiko Epson) was charged with any of the white inks prepared above. The ink cartridge is mounted in the printer, and a sold pattern was formed on an A4 sheet prepared by cut out from a recording medium (Epson Clear-proof Film (trade mane) manufactured by Seiko Epson). The formation of the sold pattern was performed under the conditions: dot weight of 11 ng, resolution of 1440 dpi×1440 dpi, and duty of 100%.

The resulting solid pattern was subjected to measurement for L* value (whiteness) with a spectrophotometer Spectrolino (manufactured by GretagMacbeth) with a D50 light source at a field of view of 2 degrees. The evaluation criteria were as follows, and the results are shown in Table 1.

For the measurement using the spectrophotometer, the surface of the sample opposite to the surface to be measured was covered with a black pasteboard. The pasteboard had an optical density OD of 2.0.
  A: $L^* \geq 75$
  B: $70 \leq L^* < 75$
  C: $60 \leq L^* < 70$
  D: $L^* < 60$ 3. 2. 2. Covering Power The hiding power of each sample prepared in the same manner as in "3. 2. 1. Whiteness" was evaluated. More specifically, each sample was set in a multi-angle colorimeter ARM-500V (manufactured by JASCO Corporation) and the transmittance Tn (%) of the sample was measured every 1 nm in wavelength in the visible light region (380 nm to 800 nm). The transmittances measured at these wavelengths were integrated to obtain hiding factor S. The hiding factor S is represented by a number from 0 to 32000: S=0 when the ink completely covers (hides) the underlying object; S=32000 when the ink is completely transparent. The evaluation criteria were as follows, and the results are shown in Table 1:

A: S<500
B: 500≤S<1000
C: 1000≤S<1300
D: S≥1300

3. 2. 3. Rub Fastness

The rub fastness of each sample prepared in the same manner as in "3. 2. 1. Whiteness" was tested for evaluation by rubbing the sample with a finger and a nail of a person who performed the test. The rubbing test with the finger and nail was performed in such a manner that the surface of the recorded image was rubbed two or three times with the finger and nail. The evaluation criteria were as follows, and the results are shown in Table 1:

A: The image was not peeled even by being rubbed strongly with the finger and nail.
B: The image was peeled with the nail, but was not with the finger.
C: The image was peeled by being rubbed lightly.

3. 2. 4. Physical Strength

The Physical strength of each sample prepared in the same manner as in "3. 2. 1. Whiteness" was tested for evaluation by rubbing the sample with a finger and a nail of a person who performed the test. The rubbing test with the finger and nail was performed in such a manner that the surface of the recorded image was rubbed two or three times with the finger and nail. The evaluation criteria were as follows, and the results are shown in Table 1:

A: The image was not crushed even by being rubbed strongly with a finger and a nail.
B: The image was crushed with the nail, but was not with the finger.

3. 2. 5. Settleability (Storage Stability)

Each of the white ink samples prepared above was diluted with ion exchanged water to prepare a dispersion liquid (viscosity: 10) containing 10% by mass of the white ink sample. Then, 10 mL of the dispersion liquid was placed in a 10 mL graduated cylinder and allowed to stand at room temperature (25° C.) and a humidity of 50% RH for one week. Then, 2 mL of the supernatant liquor of the dispersion liquid was taken from the graduated cylinder.

Then, 1 g of the thus obtained sample was diluted 1000 times with distilled water. Subsequently, the absorbance (Abs value) of the diluted sample was measured at a wavelength of 500 nm with a spectrophotometer U-3300 manufactured by Hitachi. The absorbance of the diluted sample was compared with the absorbance of the dispersion liquid immediately after preparation measured in the same manner as above, and the persistence of the absorbance was calculated using the following equation (i):

Absorbance persistence (%)=100×(absorbance of diluted sample/absorbance of dispersion liquid immediately after preparation)  (i)

The results were evaluated for settleability (storage stability) according to the following criteria, and the evaluation results are shown in Table 1:

A: Persistence≥90%
B: 70%≤Persistence<90%
C: Persistence<70%

3. 2. 6. Transmittance Ratio

The solid pattern samples formed in the same manner as in "3. 2. 1. Whiteness" with white ink samples of Examples 1 and 3 and Comparative Example 2 were measured for average total light transmittances (Tt) and average diffuse transmittances (Td), and the ratio (Td/Tt) of the average diffuse transmittance (Tt) to the average total light transmittance (Tt)(hereinafter referred to as Td/Tt ratio) was obtained for each sample. More specifically, each sample was set in a multi-angle colorimeter ARM-500V (manufactured by JASCO Corporation) and the total light transmittance and diffuse transmittance of the sample were measured every 1 nm in wavelength in the visible light region (380 nm to 800 nm). The total light transmittances and diffuse transmittances measured at these wavelengths were arithmetically averaged to obtain an average total light transmittance (Tt) and an average diffuse transmittance (Td). Thus the Td/Tt ratio was calculated using the obtained Tt and Td. The Tt and Td values and Td/Tt transmittance ratio of each sample are shown in Table 2.

3. 3. Evaluation Results

The results of whiteness, covering power, rub fastness, physical strength and settleability are shown in Table 1 together. Td/Tt ratios are shown in Table 2.

TABLE 1

|  | Example | | | | | | | | Comparative Example | | | | | |
|---|---|---|---|---|---|---|---|---|---|---|---|---|---|---|
|  | 1 | 2 | 3 | 4 | 5 | 6 | 7 | 8 | 1 | 2 | 3 | 4 | 5 | 6 |
| Fluorene-based resin particles (refractive index: 1.71) | 7.0 | 7.0 | 7.0 | 7.0 | 5.0 | 30.0 | 7.0 |  | 7.0 | 7.0 | 7.0 |  |  |  |
| Vinylidene chloride-based resin (refractive index: 1.6) |  |  |  |  |  |  |  | 7.0 |  |  |  |  |  |  |
| Hollow resin particles (refractive index: 1.5) |  |  |  |  |  |  |  |  |  |  |  |  | 10.0 |  |
| Titanium dioxide (refractive index: 2.7) |  |  |  |  |  |  |  |  |  |  |  |  |  | 10 |
| Fluororesin (refractive index: 1.35) | 5.0 | 3.0 |  |  | 3.00 | 15.0 | 0.35 | 5.00 |  |  |  |  |  |  |
| Acrylic resin (refractive index: 1.47) |  |  | 3.0 |  |  |  |  |  |  | 5.0 |  |  | 5.0 | 3.0 | 3 |
| Styrene-based resin (refractive index: 1.53) |  |  |  | 1.0 |  |  |  |  |  | 3.0 |  |  |  |  |
| BYK-348 | 1.0 | 1.0 | 1.0 | 1.0 | 1.0 | 1.0 | 1.0 | 1.0 | 1.0 | 1.0 | 1.0 | 1.0 | 1.0 | 1.0 |
| Trimethylol propane | 10.0 | 10.0 | 10.0 | 10.0 | 10.0 | 10.0 | 10.0 | 10.0 | 10.0 | 10.0 | 10.0 | 10.0 | 10.0 | 10.0 |

TABLE 1-continued

|  |  | Example |  |  |  |  |  |  |  | Comparative Example |  |  |  |  |  |
|---|---|---|---|---|---|---|---|---|---|---|---|---|---|---|---|
|  |  | 1 | 2 | 3 | 4 | 5 | 6 | 7 | 8 | 1 | 2 | 3 | 4 | 5 | 6 |
| 1,2-Hexanediol | | 3.0 | 3.0 | 3.0 | 3.0 | 3.0 | 3.0 | 3.0 | 3.0 | 3.0 | 3.0 | 3.0 | 3.0 | 3.0 | 3.0 |
| 2-Pyrrolidone | | 2.0 | 2.0 | 2.0 | 2.0 | 2.0 | 2.0 | 2.0 | 2.0 | 2.0 | 2.0 | 2.0 | 2.0 | 2.0 | 2.0 |
| Ion exchanged water | | Balance | Balance | Balance | Balance | Balance | Balance | Balance | Balance | Balance | Balance | Balance | Balance | Balance | Balance |
| Total (mass %) | | 100 | 100 | 100 | 100 | 100 | 100 | 100 | 100 | 100 | 100 | 100 | 100 | 100 | 100 |
| Evaluation | Whiteness | B | A | C | C | B | A | B | B | D | D | A | D | A | A |
|  | Covering power | B | B | C | C | B | A | B | C | D | D | B | D | A | A |
|  | Rub fastness | A | B | A | B | B | B | B | A | A | A | C | A | B | B |
|  | Physical strength | A | A | A | A | A | A | A | A | A | A | A | — | C | B |
|  | Settleabilit | A | A | A | A | A | A | A | A | A | A | A | A | C | C |

TABLE 2

|  | Average diffusion transmittance (Td) | Average total light transmittance (Tt) | Td/Tt ratio |
|---|---|---|---|
| Example 1 | 0.389 | 0.447 | 0.870 |
| Example 3 | 0.140 | 0.825 | 0.169 |
| Comparative Example 2 | 0.072 | 0.878 | 0.082 |

The white inks of the Examples exhibited good whiteness, covering power, rub fastness and physical strength, and low settleability (good storage stability).

On the other hand, in the white ink of Comparative Example 1, the proportion of the constituent (acrylic resin shown in Table 1) corresponding to the second material having a refractive index of 1.4 to less than 1.5 exceeded 50 parts by mass relative to 100 parts by mass of the constituent (fluorene-based resin particles shown in Table 1) corresponding to the resin particles (A) having a refractive index of 1.6 or more. Consequently, the second material hindered the resin particles (A) from producing an advantageous effect, and the recorded image was inferior in whiteness and hiding power.

In the white ink of Comparative Example 2, the proportion of the constituent (styrene-based resin shown in Table 1) corresponding to the first material having a refractive index of 1.5 to less than 1.6 exceeded 34 parts by mass relative to 100 parts by mass of the constituent (fluorene-based resin particles shown in Table 1) corresponding to the resin particles (A) having a refractive index of 1.6 or more. Consequently, the first material hindered resin particles (A) from producing an advantageous effect, and the recorded image was inferior in whiteness and hiding power.

The white ink of comparative Example 3 did not contain a constituent corresponding to the material (B). Accordingly, the recorded image was inferior in rub fastness.

The white ink of Comparative Example 4 did not contain a constituent corresponding to the resin particles (A). Accordingly, a white image was not formed.

The white ink of Comparative Example 5 contained hollow resin particles instead of a constituent corresponding to the resin particles (A). Although the whiteness and hiding power of the recorded image was good due to the hollow resin particles, the physical strength and the settleability were not satisfactory.

The results of transmittance ratio (Td/Tt) of Examples 1 and 3 and Comparative Example 2 suggest that the white inks of the Examples can form images having a Td/Tt ratio of 0.1 or more and exhibiting good whiteness.

The invention is not limited to the above-described embodiments, and various modifications may be made. For example, the invention includes substantially the same form as the disclosed embodiments (for example, a form including the same function and method and producing the same result, or a form having the same purpose and producing the same effect). Some elements unessential to the form of the disclosed embodiment may be replaced. The form of an embodiment of the invention includes an element producing the same effect or achieving the same object, as the form of the disclosed embodiments. The forms of the disclosed embodiments may be combined with the known art.

What is claimed is:

1. A white ink composition for ink jet recording comprising:
    resin particles (A) having a refractive index of 1.6 or more; and
    a material (B) including at least one selected from the group consisting of:
    5 to 34 parts by mass, relative to 100 parts by mass of the resin particles (A), of a first material having a refractive index in the range of 1.5 to less than 1.6,
    5 to 50 parts by mass, relative to 100 parts by mass of the resin particles (A), of a second material having a refractive index in the range of 1.4 to less than 1.5, and
    5 to 100 parts by mass, relative to 100 parts by mass of the resin particles (A), of a third material having a refractive index of less than 1.4,
    wherein the material (B) is at least one material selected from the group consisting of fluororesins, acrylic resins, styrene-based resins, and polymerizable monomers, and
    wherein the white ink composition does not contain a metal oxide or hollow resin particles in an amount of 1.0% by mass or more.

2. The white ink composition according to claim 1, wherein the resin particles (A) are made of at least one resin selected from the group consisting of melamine-based resins, phenol-based resins, vinylidene chloride-based resins, and fluorene-based resins.

3. An ink jet recording method comprising:
    forming an image with the white ink composition as set forth in claim 2.

4. The white ink composition according to claim 1, wherein the white ink composition contains 30% by mass or less of a polymerizable monomer as the material (B).

5. An ink jet recording method comprising:
    forming an image with the white ink composition as set forth in claim 4.

6. The white ink composition according to claim 1, wherein the ink composition is capable of forming an image on a recording medium, the image having an average total light transmittance Tt and an average diffuse transmittance Td with a Td/Tt ration of 0.1 or more, wherein the average total light transmittance Tt is an average of total light transmittances of the image measured every 1 nm in wavelength from 380 nm to 800 nm, and the average diffuse transmittance Td is an average of diffuse transmittances of the image measured every 1 nm in wavelength from 380 nm to 800 nm.

7. An ink jet recording method comprising:
forming an image with the white ink composition as set forth in claim 6.

8. The white ink composition according to claim 1, wherein the resin particles (A) have an average particle size of 200 nm or more on a volume basis.

9. An ink jet recording method comprising:
forming an image with the white ink composition as set forth in claim 8.

10. The white ink composition according to claim 1, wherein the resin particles (A) content of white ink composition is in the range of 5% to 30% by mass.

11. An ink jet recording method comprising:
forming an image with the white ink composition as set forth in claim 10.

12. An ink jet recording method comprising:
forming an image with the white ink composition as set forth in claim 1.

13. The white ink composition according to claim 1, wherein the white ink composition does not contain a metal oxide or hollow resin particles in an amount of 0.5% by mass or more.

14. The white ink composition according to claim 1, wherein the white ink composition does not contain a metal oxide or hollow resin particles in an amount of 0.1% by mass or more.

15. The white ink composition according to claim 1, wherein the white ink composition does not contain a metal oxide or hollow resin particles in an amount of 0.05% by mass or more.

16. The white ink composition according to claim 1, wherein the white ink composition does not contain a metal oxide or hollow resin particles in an amount of 0.01% by mass or more.

17. The white ink composition according to claim 1, wherein the white ink composition does not contain a metal oxide or hollow resin particles in an amount of 0.001% by mass or more.

* * * * *